(12) United States Patent
Maruko et al.

(10) Patent No.: US 8,432,194 B2
(45) Date of Patent: Apr. 30, 2013

(54) BIAS POTENTIAL GENERATING CIRCUIT

(75) Inventors: Tsuguto Maruko, Tokyo (JP); Kouhei Tanaka, Kanagawa (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 69 days.

(21) Appl. No.: 12/909,162

(22) Filed: Oct. 21, 2010

(65) Prior Publication Data

US 2011/0095793 A1    Apr. 28, 2011

(30) Foreign Application Priority Data

Oct. 22, 2009    (JP) ................................. 2009-243512

(51) Int. Cl.
*H03B 28/00*    (2006.01)
(52) U.S. Cl.
USPC ............................ 327/129; 327/124; 327/172
(58) Field of Classification Search .................. 327/124, 327/129, 172
See application file for complete search history.

(56) References Cited

U.S. PATENT DOCUMENTS

| | | | | |
|---|---|---|---|---|
| 4,731,720 | A * | 3/1988 | Takahashi .................. | 363/21.09 |
| 5,034,874 | A * | 7/1991 | Araki .............................. | 363/41 |
| 5,166,870 | A * | 11/1992 | Shimizu et al. ................. | 363/41 |
| 5,167,152 | A * | 12/1992 | Shimizu et al. ............ | 73/204.18 |
| 5,376,872 | A * | 12/1994 | Hara .............................. | 318/799 |
| 5,744,987 | A * | 4/1998 | Embree et al. ................. | 327/103 |
| 5,804,997 | A * | 9/1998 | Nishizono et al. ............. | 327/103 |
| 5,866,969 | A * | 2/1999 | Shimada et al. .............. | 310/318 |
| 6,445,790 | B1 * | 9/2002 | Burgan et al. ................. | 379/361 |
| 6,956,727 | B1 * | 10/2005 | Brokaw ....................... | 361/93.7 |
| 7,015,653 | B2 * | 3/2006 | Fujiwara et al. .............. | 315/224 |
| 7,378,805 | B2 * | 5/2008 | Oh et al. ....................... | 315/291 |
| 7,755,020 | B2 * | 7/2010 | Sakura et al. ............. | 250/214 R |

FOREIGN PATENT DOCUMENTS

| | | |
|---|---|---|
| JP | 2005-217613 | 8/2005 |
| JP | 2007-151098 | 6/2007 |

* cited by examiner

*Primary Examiner* — Thomas J Hiltunen
(74) *Attorney, Agent, or Firm* — Volentine & Whitt, PLLC

(57) ABSTRACT

A bias potential generating circuit includes a clock supply circuit that generates a clock signal having a predetermined frequency; a rising sine wave generating circuit that generates a rising wave form signal having a wave form of a rising portion of a sine wave; a ΔΣ conversion circuit that generates a pulse width modulation signal by pulse width modulating the rising wave form signal; a first resistor, one end connected to a reference potential input terminal of an operational amplifier; a second resistor, one end connected to the first resistor and to the reference potential input terminal of the operational amplifier, and the other end being grounded; and a switch connected to a power supply and to the other end of the first resistor, the switch being turned ON and OFF by the pulse width modulation signal.

6 Claims, 15 Drawing Sheets

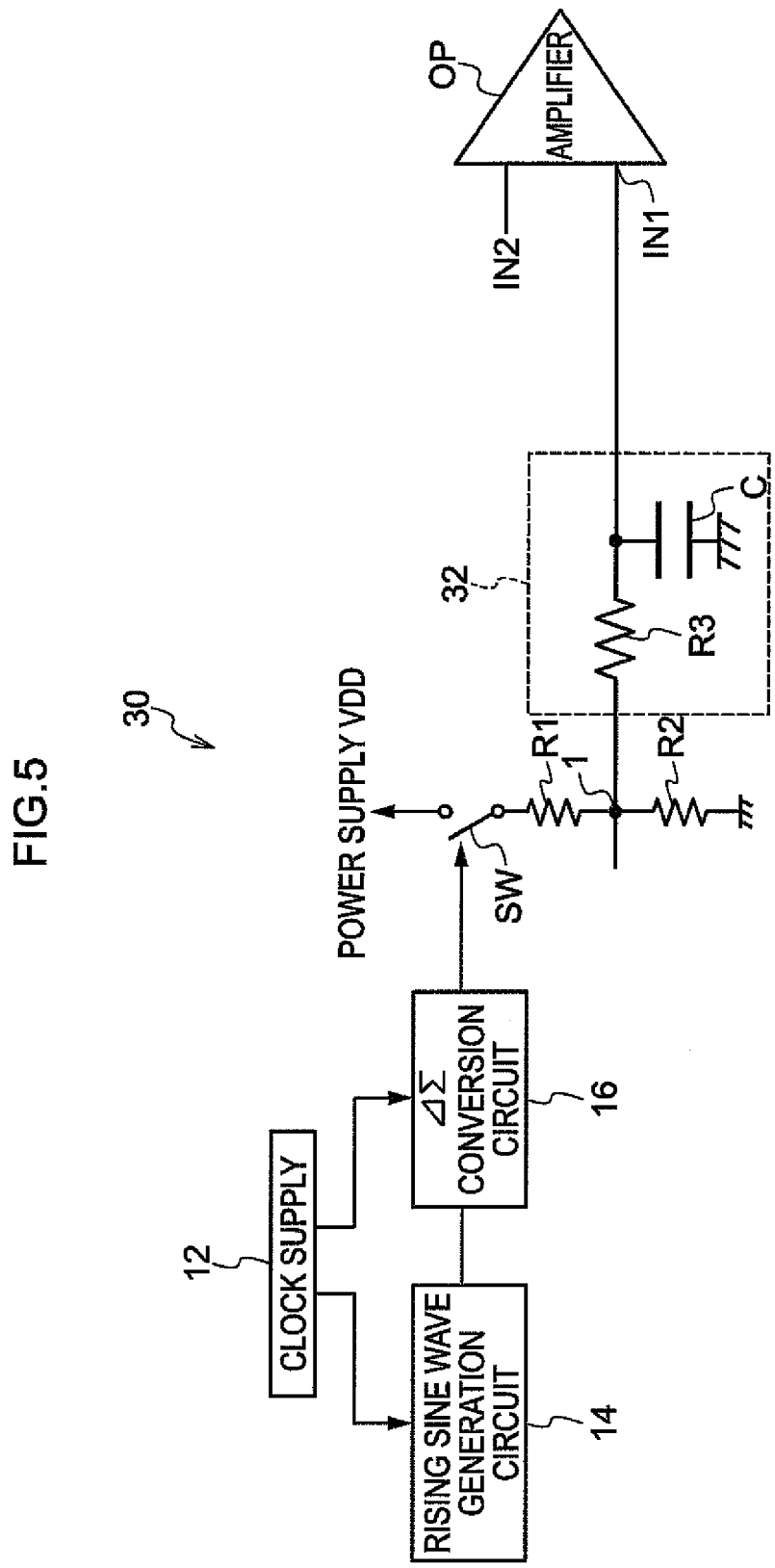

BIAS POTENTIAL GENERATING CIRCUIT

CROSS-REFERENCE TO RELATED APPLICATION

This application claims priority under 35 USC 119 from Japanese Patent Application No. 2009-243512, filed on Oct. 22, 2009, the disclosure of which is incorporated by reference herein.

BACKGROUND OF THE INVENTION

1. Field of the Invention

The present invention relates to a bias potential generating circuit and particularly relates to a bias potential generating circuit which can be applied to an audio amplifier or the like.

2. Description of the Related Art

As a conventional circuit that generates a bias potential, a bias potential generating circuit 100 as shown in FIG. 12 is generally used. A bias potential generating circuit 100 shown in FIG. 12 is configured to include a switch SW1, a resistor R1, a resistor R2, and a capacitive element C1. One end of the switch SW1 is connected to a power supply VDD. One end of the resistor R1 is connected to the other end of the switch SW1. One end of the resistor R2 is connected to the other end of the resistor R1, and the other end of the resistor R2 is grounded. One end of the capacitive element C1 is connected to a node 1 which is a connecting point of the other end of the resistor R1 and the one end of the resistor R2, and the other end of the capacitive element C1 is grounded.

The bias potential generating circuit 100 having the aforementioned configuration allows generation of a desired bias potential, according to magnitude of respective resistance values of the resistors R1 and R2.

The operation of the above-described bias potential generating circuit 100 is shown in FIG. 13. At the time of startup, the bias potential generating circuit 100 turns on an enable signal EN, which is an on-off control signal of the switch SW1, to bring the switch SW1 into a conductive state. Accordingly, the capacitive element C1 is gradually charged with a charge from the power supply VDD. As a result, the bias potential of the node 1 gradually increases from the GND level to a predetermined bias potential. The rising time of the bias potential, namely, a time constant τ is determined based on the resistance values of the resistors R1, R2, and the capacitance of the capacitive element C1.

The operation of the bias potential generating circuit 100 at the time of shutdown is similar to that of startup. The bias potential generating circuit 100 turns off the enable signal EN to bring the switch SW1 into a non-conductive state. Accordingly, a charge accumulated in the capacitive element C1 is gradually discharged via the resistor R2. Due thereto, as shown in FIG. 14, the bias potential of the node 1 gradually decreases. In this case, the time constant τ is determined based on the resistance value of the resistor R2 and the capacitance of the capacitive element C1.

This kind of bias potential generating circuit is used for generation of a reference potential in, for example, an audio amplifier or the like. However, in a case in which this circuit is used in an audio amplifier, at the time of startup of the bias potential generating circuit, a POP noise may be generated.

Japanese Patent Application Laid-Open (JP-A) No. 2007-151098 discloses a control device that prevents pop noise at the time of startup by controlling a smoothing capacitor used for generating a reference potential by a PWM (Pulse Width Modulation) signal.

Pop noise is a noise originating in transition of a potential at the startup time of the bias potential generating circuit. Therefore, in order to obtain preferable transition of a potential, the resistance values of the resistors R1, R2, and the capacitance of the capacitive element C1 need to be increased, and the time constant τ also needs to be made longer.

However, due to the time constant τ being made longer, the costs of the resistors and the capacitive element would increase, and the size of the bias potential generating circuit would become larger.

For example, the control device disclosed in JP-A No. 2007-151098 is connected is a speaker. However, the speaker has a low impedance, and therefore, in order to increase the voltage to a reference potential, a transistor having a large size becomes necessary in a circuit to generate a reference potential of the control device. For this reason, a circuit area of the control device becomes larger, and the cost of the device increases. Further, a switching noise (EMI noise) may occur due to wiring of the speaker.

Further, JP-A No. 2005-217613 discloses pop noise preventing circuit as shown in FIG. 15. In this pop noise preventing circuit, in order to rise a reference potential to a predetermined bias potential Vref, two threshold potentials V1, V2 are fixed, and the reference potential is increased gradually from 0V, and after exceeding the threshold potential V1, the potential is made to rapidly become higher, and after the reference potential exceeds the threshold potential V2, the potential is made to gradually become higher.

However, in the circuit disclosed in JP-A No. 2005-217613, as described above, the reference potential cannot be changed smoothly before and after the time when the reference potential exceeds the threshold potentials V1, V2. For this reason, in the circuit disclosed in JP-A No. 2005-217613, pop noise may be still occur around the threshold potentials V1, V2.

SUMMARY OF THE INVENTION

The present invention provides a bias potential generating circuit that can effectively prevent pop noise.

A first aspect of the present invention is A bias potential generating circuit including: a clock signal generating section that generates a clock signal having a predetermined frequency; a rising wave form signal generating section that generates, synchronous to the clock signal, a rising wave form signal having a wave form of a rising portion of a sine wave; a pulse width modulation signal generating section that generates, synchronous to the clock signal, a pulse width modulation signal by pulse width modulating the rising wave form signal; a first resistor having a first end connected to a reference potential input terminal of an operational amplifier; a second resistor having a first end connected to the first end of the first resistor and to the reference potential input terminal of the operational amplifier, and a second end connected to a ground; and a switch, having a first end connected to a power supply and a second end connected to a second end of the first resistor, that turns ON and OFF based on the pulse width modulation signal.

A second aspect of the present invention, in the above first aspect, the bias potential generating circuit may further include a noise removal filter provided between the reference potential input terminal of the operational amplifier, and a connecting portion of the first resistor and the second resistor.

A third aspect of the present invention, in the above second aspect, the clock signal generating section may generate a clock signal having a frequency higher than the predetermined frequency, and the noise removal filter may include a resistor having a resistance value lower than a resistance value that corresponds to the predetermined frequency, and a capacitative element.

A fourth aspect of the present invention, in the above aspects, the bias potential generating circuit may further include a falling wave form signal generating section that generates a falling wave form signal having a wave form of a falling portion of the sine wave, and a wave form signal selecting section that selects the rising wave form signal and outputs the rising wave form signal to the pulse width modulation signal generating section during a startup period of the bias potential generating circuit, and that selects the falling wave form signal and outputs the falling wave form signal to the pulse width modulation signal generation section during a shutdown period of the bias potential generating circuit.

A fifth aspect of the present invention, in the above aspects, the bias potential generating circuit may further include an inversion section that generates an inverted pulse width modulation signal by inverting the pulse width modulation signal, wherein during a startup period of the bias potential generating circuit, the pulse width modulation signal may be selected and outputted to the switch, and during a shutdown period of the bias potential generating circuit, the inverted pulse width modulation signal may be selected and outputted to the switch.

A sixth aspect of the present invention, in the above aspects, the pulse width modulation signal generating section may generate the pulse width modulation signal by performing $\Delta\Sigma$ conversion to the rising wave form signal.

As described above, the present invention makes can effectively prevent pop noise.

BRIEF DESCRIPTION OF THE DRAWINGS

Exemplary Embodiments of the present invention will be described in detail based on the following figures, wherein:

FIG. 5 is a circuit diagram of a bias potential generating circuit according to a second exemplary embodiment of the present invention;

DETAILED DESCRIPTION OF THE INVENTION

An exemplary embodiment of the present invention is hereinafter described in detail with reference to the drawings attached hereto.

[First Exemplary Embodiment]

Figure 1:
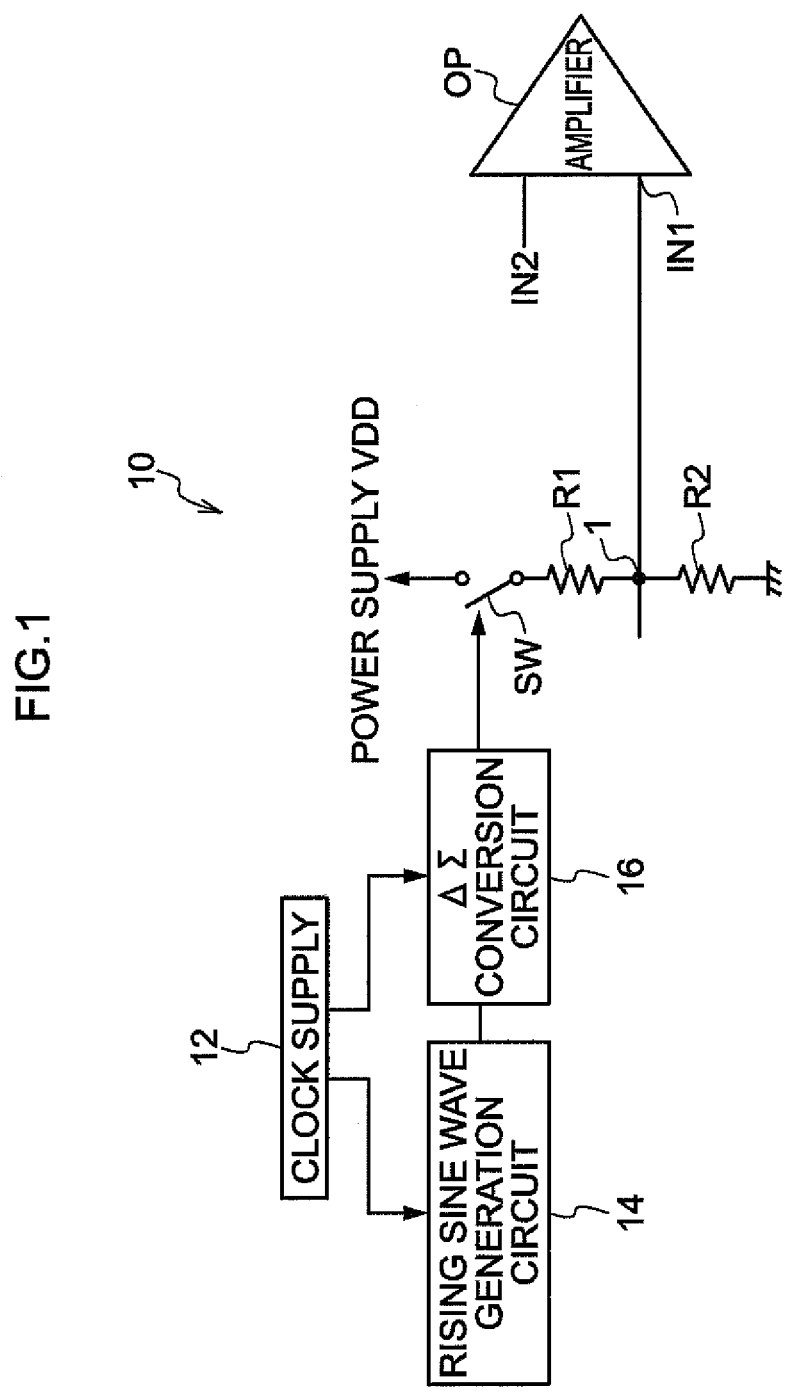
FIG. 1 is a circuit diagram of a bias potential generating circuit according to a first exemplary embodiment of the present invention.
Figure 12:
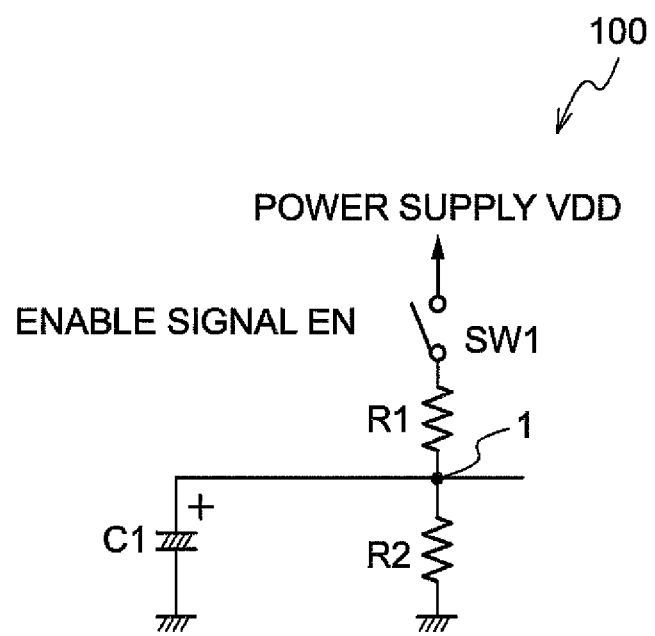
FIG. 12 is a circuit diagram of a conventional bias potential generating circuit.
Figure 13:
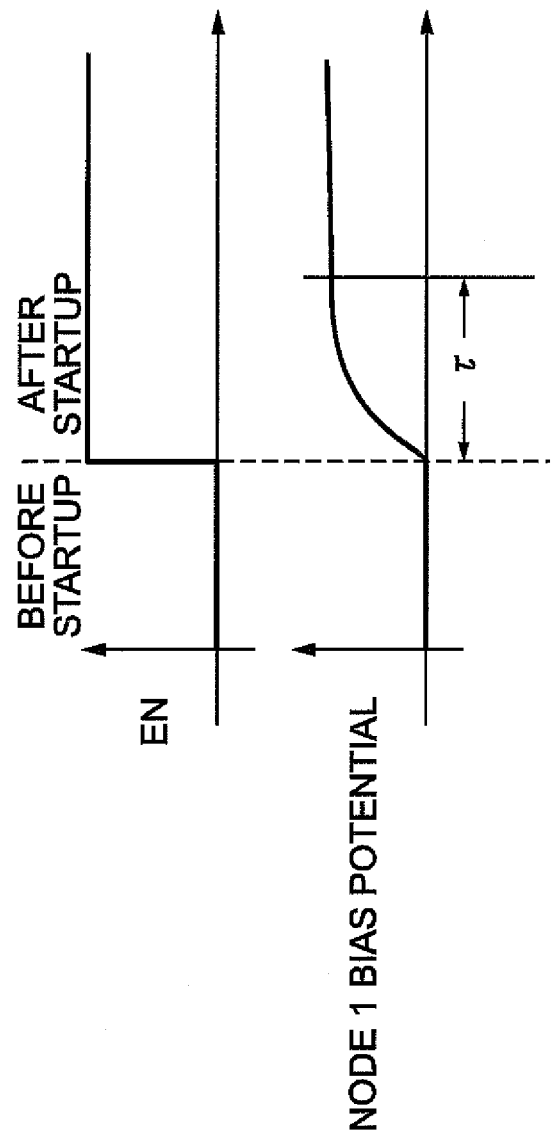
FIG. 13 is a diagram showing a wave form of enable signal EN, and a wave form of a bias potential of node 1, during the startup period of a conventional bias potential generating circuit.
Figure 14:
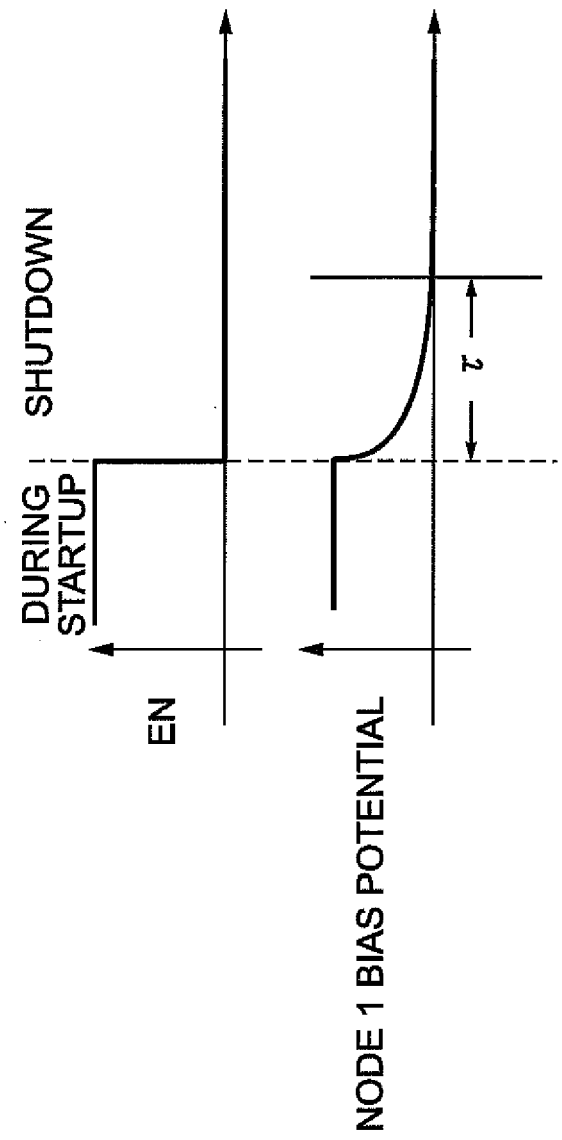
FIG. 14 is a diagram showing a wave form of enable signal EN, and a wave form of a bias potential of node 1, during the shutdown period of a conventional bias potential generating circuit.
Figure 15:
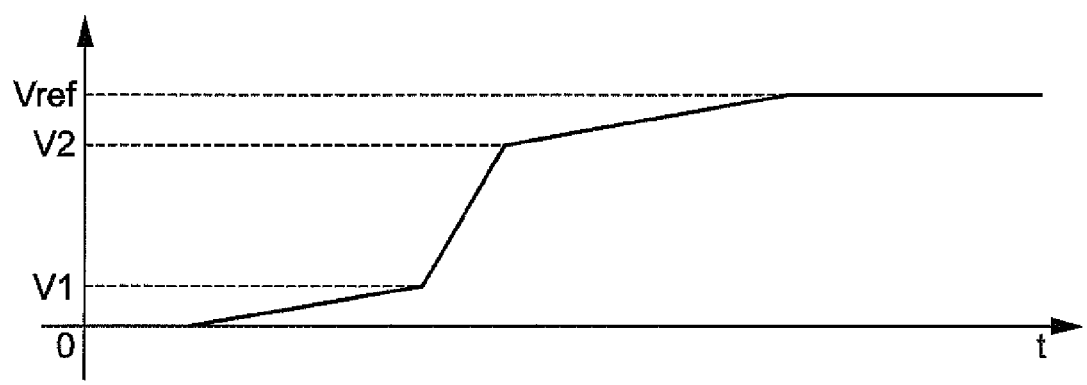
FIG. 15 is a wave from chart of a bias potential generated by a conventional bias potential generating circuit.

FIG. 1 shows a circuit diagram of a bias potential generating circuit 10 according to a first exemplary embodiment of the present invention. Note that, the same portions as those of the bias potential generating circuit 100 shown in FIG. 12 are denoted by the same reference numerals.

As shown in FIG. 1, the bias potential generating circuit 10 is configured to include a clock supply circuit 12, a rising sine wave generating circuit 14, a $\Delta\Sigma$ conversion circuit 16, a resistor R1, a resistor R2, and a switch SW1. The clock supply circuit 12 generates a clock signal having a predetermined frequency (in this exemplary embodiment, for example, 8 kHz). The rising sine wave generating circuit 14 generates a rising wave form signal having a wave form of a rising portion of a sine wave (a sine wave). The $\Delta\Sigma$ conversion circuit 16 generates a pulse width modulation signal (PWM signal) by pulse width modulating the rising wave form signal generated by the rising sine wave generating circuit 14. One end of the resistor R1 is connected to the reference potential input terminal IN1 of an amplifier (operational amplifier) OP. One end of the resistor R2 is connected to the one end of the resistor R1, and to the reference potential input terminal IN1 of the amplifier OP. The other end of the resistor R2 is grounded. One end of the switch SW1 is connected to a power supply VDD, and the other end of the switch SW1 is connected to the other end of the resistor R1. The switch SW1 is switched ON and OFF based on the pulse width modulation signal generated by the $\Delta\Sigma$ conversion circuit 16.

The bias potential generating circuit 10 as described above adjusts the resistance values of the resistors R1, R2, to generate a desired bias potential.

Figure 2:
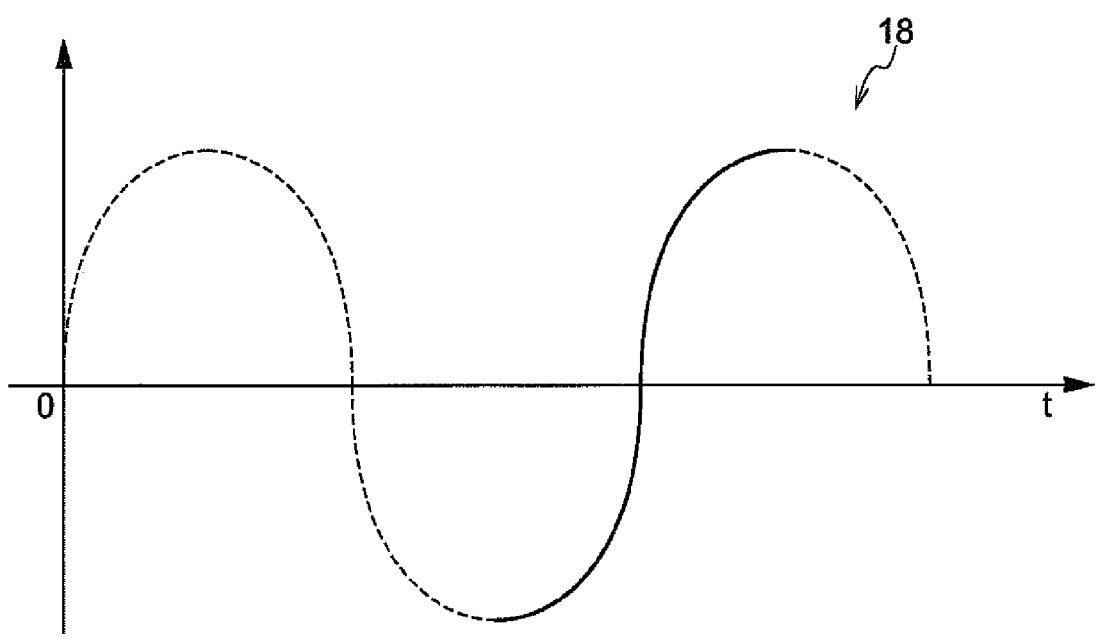
FIG. 2 is a wave form chart showing a wave form of a sine wave.
Figure 3:
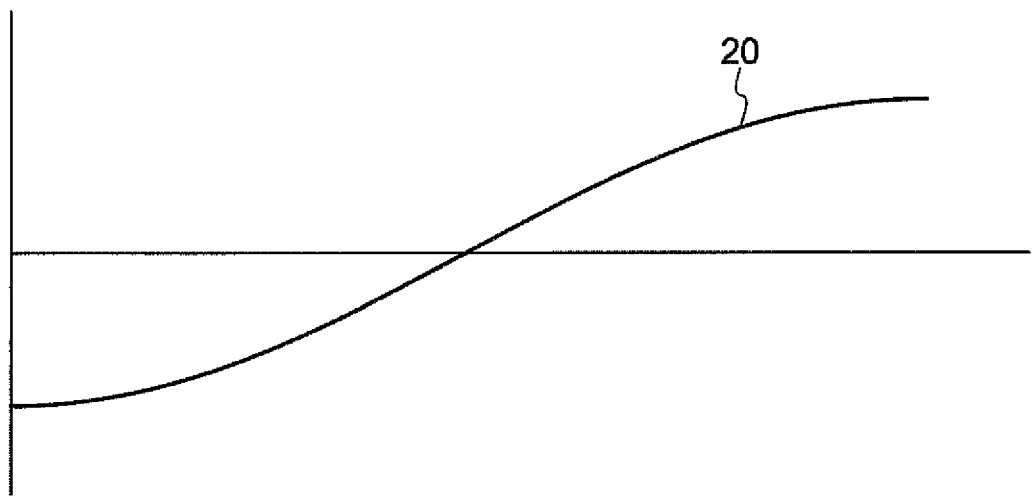
FIG. 3 is a wave form chart showing a wave form of a rising portion of a sine wave.

The rising sine wave generating circuit 14 outputs, to the $\Delta\Sigma$ conversion circuit 16, a wave signal having a wave form of a rising portion (indicated by the solid line in FIG. 2) of the sine wave 18 as shown in FIG. 2 (specifically, a rising wave form signal 20 has a wave form that monotonously increases substantially in the S-shaped form as shown in FIG. 3), in synchronous with a clock signal.

Note that, in this exemplary embodiment, the rising sine wave generating circuit 14 outputs the rising wave from signal 20, as a digital value, to the $\Delta\Sigma$ conversion circuit 16.

Figure 4A:
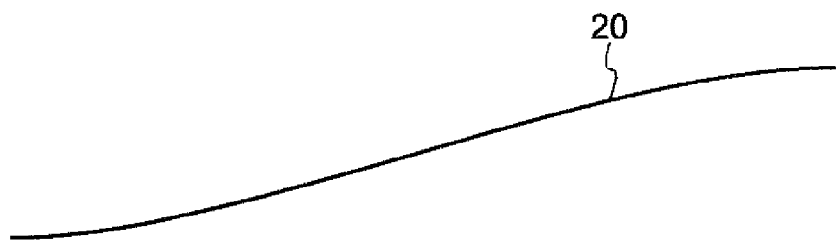
FIG. 4A is a wave form chart showing a wave form of a rising portion of a sine wave.

The $\Delta\Sigma$ conversion circuit 16 performs a $\Delta\Sigma$ modulation based on (a digital value of) the rising wave form signal 20 in synchronous with the clock signal, generates the pulse width modulation signal 22, and outputs the signal to the switch SW. The rising wave from signal 20 is a signal as shown in FIG. 4, generated by the rising sine wave generating circuit 14. An example of the pulse width modulation signal 22 is shown in FIG. 4B.

Figure 4B:
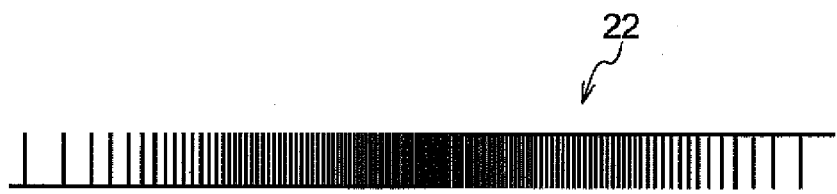
FIG. 4B is a wave form chart showing a pulse width modulation signal.

As shown in FIG. 4B, during the startup period of the bias potential generating circuit 10, the pulse width modulation signals 22 having short pulse width and long pulse intervals, are outputted. After the startup of the circuit, the pulse interval of the pulse width modulation signals 22 becomes shorter by degrees. Further, from the vicinity of the center in FIG. 4B, the pulse width of the pulse width modulation signals 22 becomes longer by degrees and the pulse intervals become longer by degrees. Namely, the pulse width modulation signal 22 is a signal that has, a low frequency at the initial stage during the startup period of the bias potential generating circuit 10, a high frequency at the medium stage during the startup period, and a low frequency at the later stage during the startup period as in the initial stage during the startup period.

When the pulse width modulation signal 22 is at the high level, the switch SW is turn ON (conducted). On the other hand, when the pulse width modulation signal 22 is at the low level, the switch SW is turned OFF (not conducted). Due to the switch SW being intermittently turned ON by the pulse width modulation signal 22 as shown in FIG. 4B, current gradually passes through the node 1 (a connecting point of the resistors R1, and R2, namely, the reference potential input terminal IN1 of the amplifier OP).

Figure 4C:
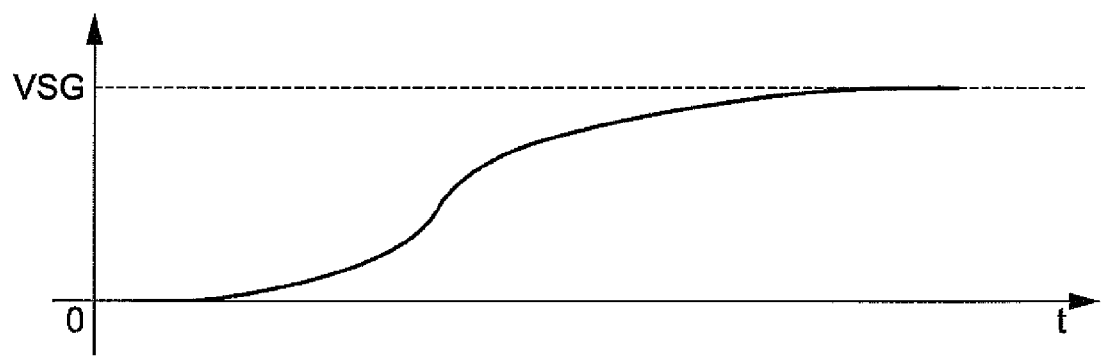
FIG. 4C is a wave form chart of a voltage of a reference potential input terminal of an amplifier at the time of startup.

As a result, the potential of the reference potential input terminal IN1 of the amplifier OP smoothly and gradually increases to a desired reference potential VSG as shown in FIG. 4C.

Accordingly, in a case in which the bias potential generating circuit 10 is applied, for example, to an audio amplifier, the bias potential generating circuit 10 of the first exemplary embodiment can effectively prevent pop noise caused by a rapid change of a potential of the reference potential input terminal IN1.

[Second Exemplary Embodiment]

Next, a second exemplary embodiment of the present invention is described. Note that the same portions as those of the bias potential generating circuit 10 described in the first exemplary embodiment are denoted by the same reference numerals, and therefore the description thereof is omitted.

FIG. 5 shows a bias potential generating circuit 30 according to the second exemplary embodiment. The bias potential generating circuit 30 differ form the bias potential generating circuit 10 shown in FIG. 1, that the bias potential generating circuit 30 includes a low pass filter 32 provided between the node 1 and the reference potential input terminal IN1 of the amplifier OP that functions as a noise removal filter. Other configuration of the bias potential generating circuit 30 is the same as that of the bias potential generating circuit 10, and a description thereof is omitted.

The low-pass filter 32 is configured to include a resistor R3 and a capacitor C. One end of the resistor R3 is connected to the node 1. One end of the capacitor C is connected to the other end of the resistor R3 and to the reference potential input terminal IN1 of the amplifier OP. The other end of the capacitor C is grounded.

Figure 6:
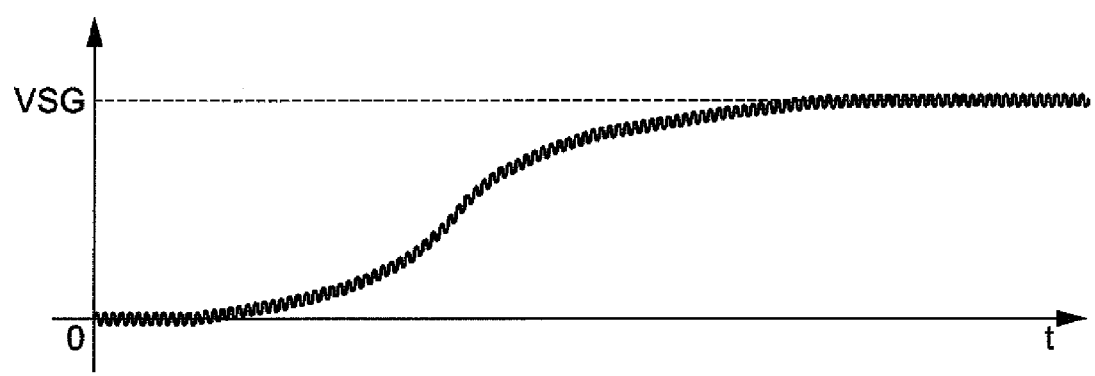
FIG. 6 is a wave form chart in a case in which a noise is occurred in a voltage of a reference potential input terminal of an amplifier.

In the bias potential generating circuit 10 of the first exemplary embodiment, the pulse width modulation signal generated by the ΔΣ conversion circuit 16 may include a high-frequency-band quantization noise generated by ΔΣ conversion processing. Accordingly, the potential of the reference potential input terminal IN1 of the amplifier OP may have a wave form including noise as shown in FIG. 6.

On the other hand, the bias potential generating circuit 30 includes the low pass filter 32, provided between the node 1 and the reference potential input terminal IN1 of the amplifier OP, that filter cuts off high frequency signal. Accordingly, the bias potential generating circuit 30 can smooth the wave form inputted to the reference potential input terminal IN1 of the amplifier OP, as shown in FIG. 4C. As a result, the bias potential generating circuit 30 according to the second exemplary embodiment can reduce adverse effects caused by quantization noise.

In this exemplary embodiment, a case of using a low pass filter serving as a noise removal filter and comprised of a resistor and a capacitor has been described. However, any low pass filter that can filter off high-frequency signal may also be used.

[Third Exemplary Embodiment]

Next, a third exemplary embodiment of the present invention is described. Note that the same portions as those of the bias potential generating circuit 30 described in the second exemplary embodiment are denoted by the same reference numerals, and therefore the description thereof is omitted.

A bias potential generating circuit according to the third exemplary embodiment is substantially the same as the bias potential generating circuit 30 described in the second exemplary embodiment. However, the bias potential generating circuit according to the third exemplary embodiment differs from the bias potential generating circuit 30 in the frequency of a clock signal generated by the clock supply circuit 12, and in the resistance value of resistor R3 of the low pass filter 32.

The frequency of the clock signal generated by the clock supply circuit 12 described in the second exemplary embodiment was, as an example, 8 kHz. However, in the third exemplary embodiment, a high-speed clock signal is used. As an example, the frequency of the clock signal generated by the clock supply circuit 12 according to the third exemplary embodiment is set at 48 kHz.

Due to the high-speed clock signal, the pulse width modulation signal generated by the ΔΣ conversion circuit 16 becomes a high-speed signal. Due thereto, as the result of the ΔΣ conversion, quantization noise appears in a frequency band which is higher than that of the second exemplary embodiment. Accordingly, the cutoff frequency of the low pass filter 32 can be made higher than that of the second exemplary embodiment. As a result, the resistance value of the resistor R3 constituting the low pass filter 32 can be reduced to approximately a half the resistance value of the second exemplary embodiment. Accordingly, the circuit scale of the bias potential generating circuit according to the third exemplary embodiment can be reduced and the cost of the circuit can be also reduced.

Note that, the frequency of the clock signal set forth above is an example, and can be appropriately selected according to the degree of decrease in the resistance value of the resistor R3.

[Fourth Exemplary Embodiment]

Next, a fourth exemplary embodiment of the present invention will be described. Note that the same sections as those of the bias potential generating circuit 30 described in the second exemplary embodiment are denoted by the same reference numerals, and therefore the description thereof is omitted.

Figure 7:
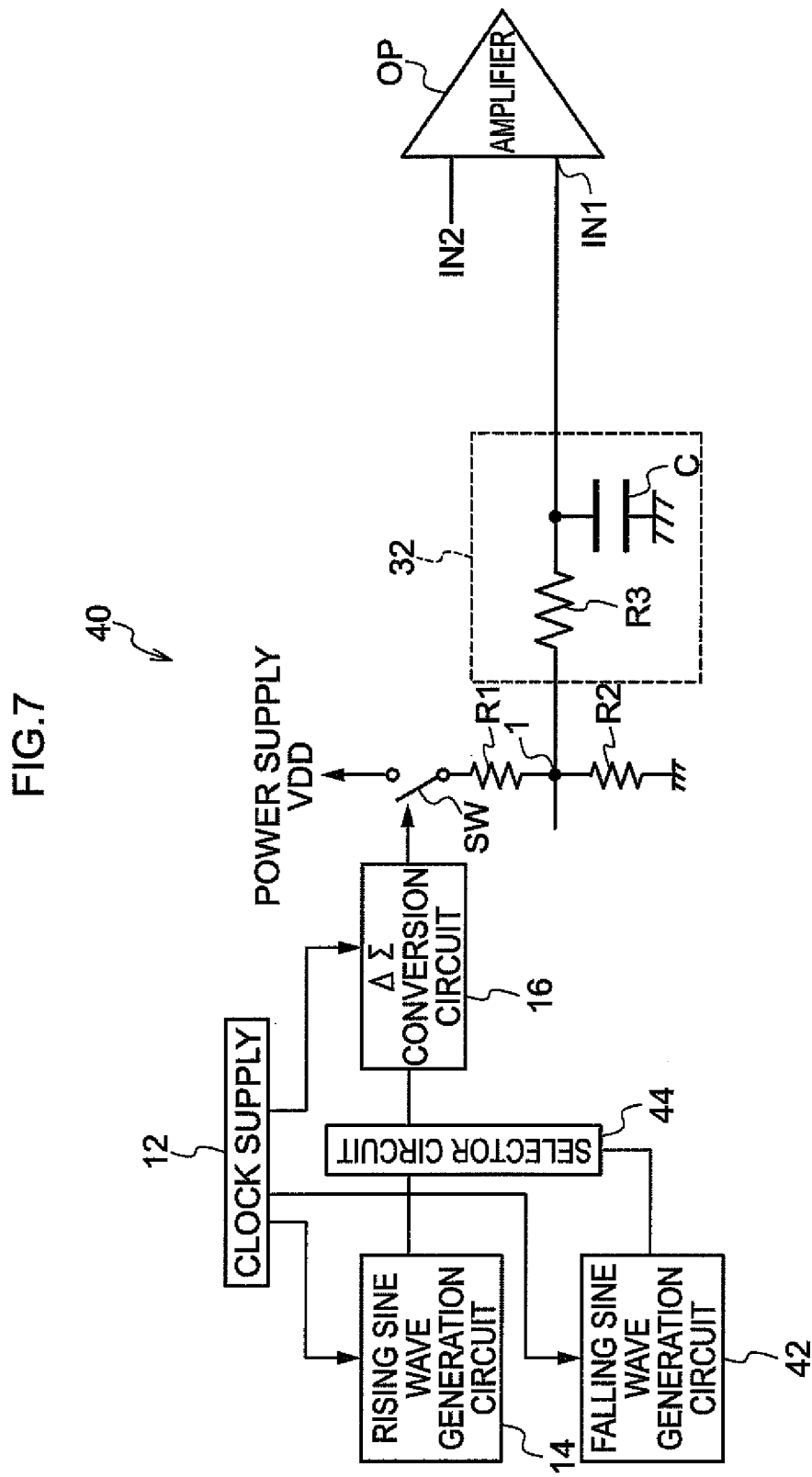
FIG. 7 is a circuit diagram of a bias potential generating circuit according to a fourth exemplary embodiment of the present invention.

FIG. 7 shows a bias potential generating circuit 40 according to the fourth exemplary embodiment. The bias potential generating circuit 40 differs from the bias potential generating circuit 30 that the bias potential generating circuit 40 additionally includes a falling sine wave generating circuit 42 and a selector circuit 44. Other configuration of the bias potential generating circuit 40 is generally the same as that of the bias potential generating circuit 30, and a description thereof is omitted.

Figure 8:
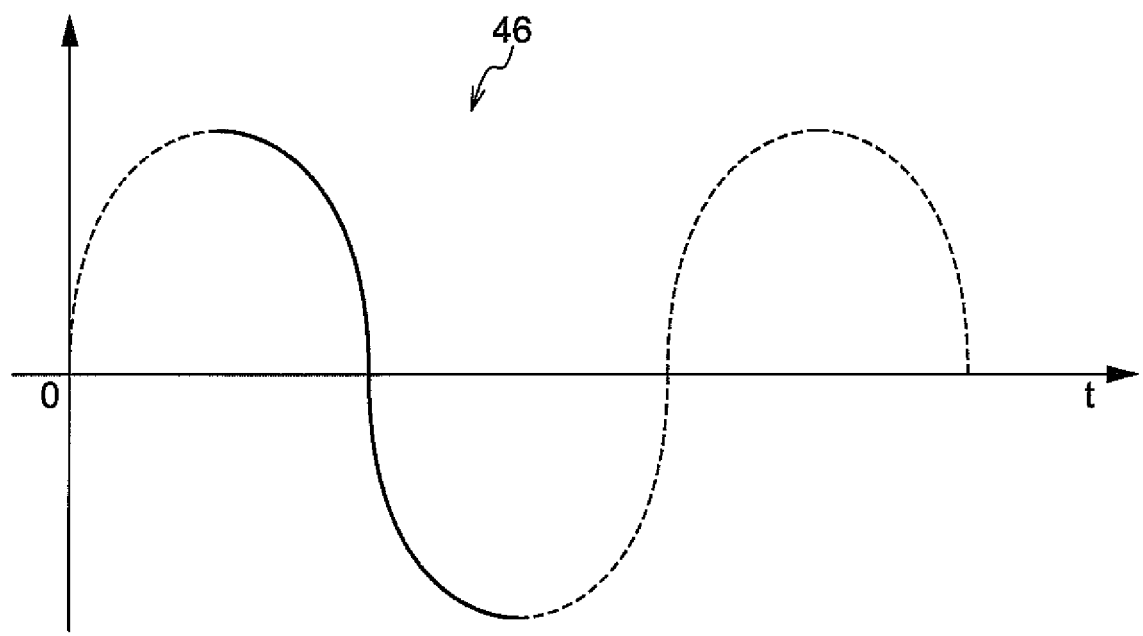
FIG. 8 is a wave form chart showing a wave form of a sine wave.
Figure 9:
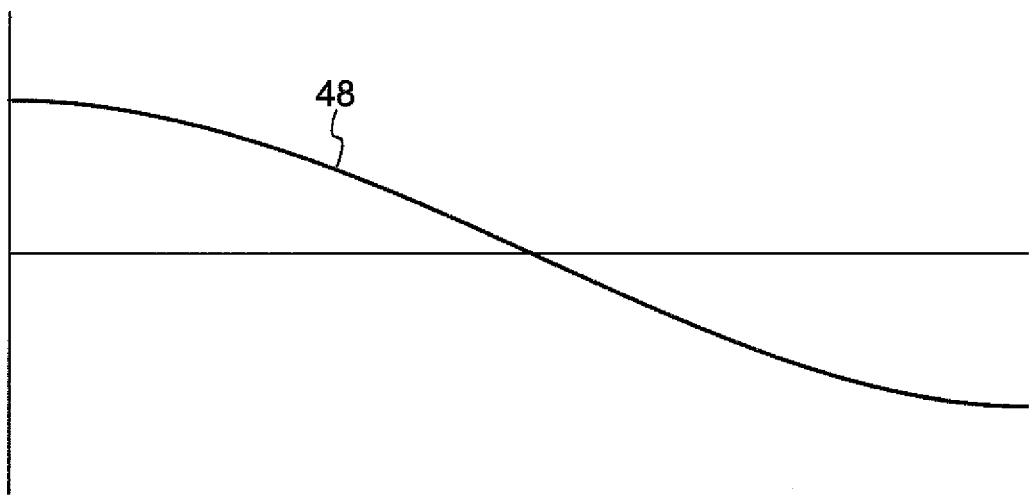
FIG. 9 is a wave form chart showing a wave form of a falling portion of a sine wave.

The falling sine wave generating circuit 42 outputs, to the Δ selector circuit 44, a wave form signal having a wave form of a falling portion (a section indicated by the solid line in FIG. 8) of the sine wave 46 as shown in FIG. 8 (specifically, a falling wave form signal 48 has a wave form that monotonously decreases substantially in the shape of S as shown in FIG. 9), in synchronous with a clock signal.

During the startup period of the bias potential generating circuit 40, the selector circuit 44 selects a rising wave form signal generated by the rising sine wave generating circuit 14, and outputs the selected signal to the ΔΣ conversion circuit 16. On the other hand, during the shutdown period of the bias potential generating circuit 40, the selector circuit 44 selects a falling wave form signal generated by the falling sine wave generating circuit 42, and outputs the selected signal to the ΔΣ conversion circuit 16.

The ΔΣ conversion circuit 16 performs ΔΣ modulation to the rising wave form signal 20 selected by the selector circuit 44, or the falling wave form signal 48, in synchronous with a clock signal. Accordingly, the ΔΣ conversion circuit 16 generates a pulse width modulation signal, and outputs the signal to the switch SW. Note that, a pulse width modulation signal generated by ΔΣ conversion of the falling wave form signal 48 using the ΔΣ conversion circuit 16 becomes a signal obtained by inverting, for example, the pulse width modulation signal shown in FIG. 4B.

Figure 10:
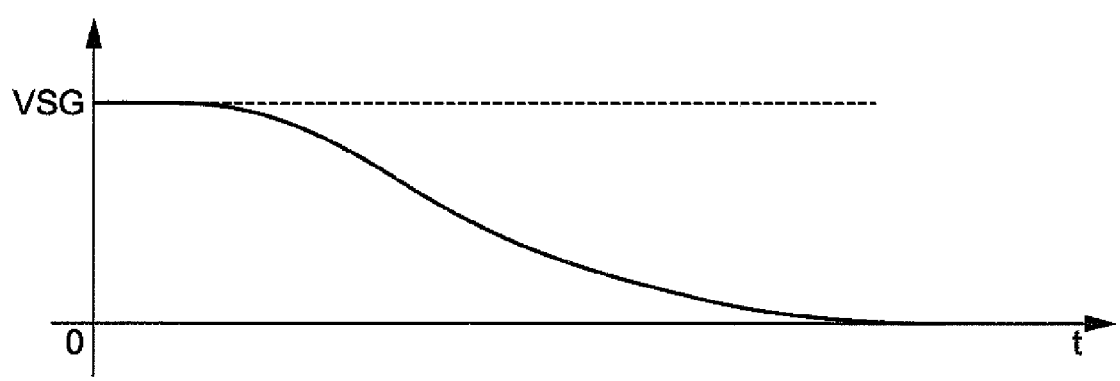
FIG. 10 is a wave form chart of a voltage of a reference potential input terminal of an amplifier during the shutdown period of the circuit.

Accordingly, in this exemplary embodiment, during the shutdown period of the bias potential generating circuit 40, the switch SW is turned ON and OFF by a pulse width modulation signal generated based on the falling wave form signal 48 which smoothly and monotonously decreases. Therefore, the potential of the reference potential input terminal IN1 of the amplifier OP decreases by degrees from the reference potential VSG, as shown in FIG. 10.

Accordingly, in a case in which the bias potential generating circuit 40 is applied to, for example, an audio amplifier, not only during the startup period of the bias potential generating circuit 40, but also during the shutdown period, the bias potential generating circuit 40 according to the fourth exemplary embodiment can effectively prevent pop noise caused by a rapid change of the potential of the reference potential input terminal IN1.

[Fifth Exemplary Embodiment]

Next, a fifth exemplary embodiment of the present invention is described. Note that the same portions as those of the bias potential generating circuit 30 described in the second exemplary embodiment are denoted by the same reference numerals, and a description thereof is omitted.

Figure 11:
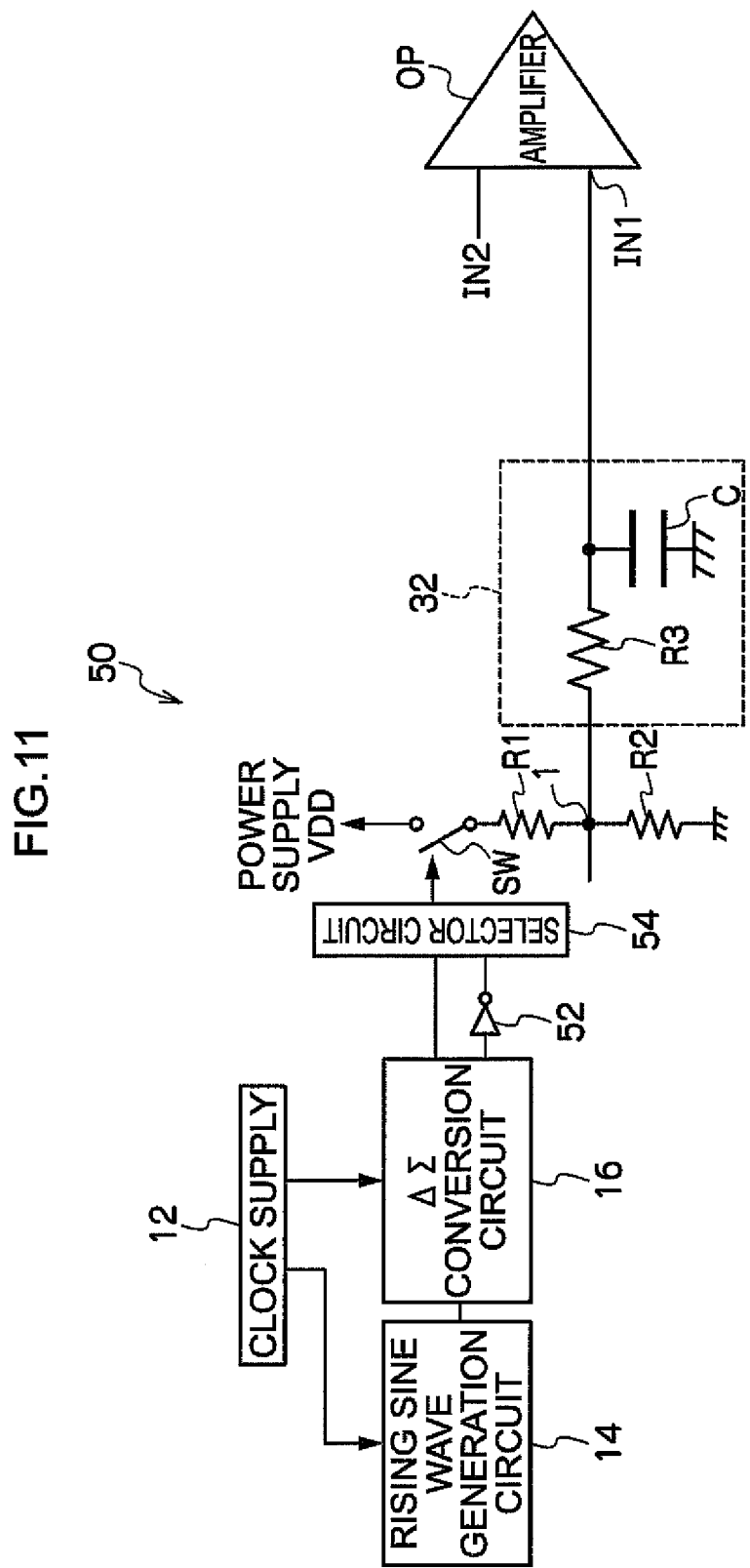
FIG. 11 is a circuit diagram of a bias potential generating circuit according to a fifth exemplary embodiment of the invention.

FIG. 11 shows a bias potential generating circuit 50 according to the fifth exemplary embodiment. The bias potential generating circuit 50 differs from the bias potential generating circuit 30 that the bias potential generating circuit 50 additionally includes an inverter circuit 52 and a selector circuit 54. Other configuration of the bias potential generating circuit 50 is the same as the configuration of the bias potential generating circuit 30, and therefore the description thereof is omitted.

The inverter circuit 52 generates an inverted pulse width modulation signal obtained by inverting the pulse width modulation signal outputted from the ΔΣ conversion circuit 16, and outputs the signal to the selector circuit 54.

During the startup period of the bias potential generating circuit 50, the selector circuit 54 selects a pulse width modulation signal outputted from the ΔΣ conversion circuit 16, and outputs the selected signal to the switch SW. On the other hand, during the shutdown period of the bias potential generating circuit 50, the selector circuit 54 selects an inverted pulse width modulation signal outputted from the inverter circuit 52, and outputs the selected signal to the switch SW.

Due thereto, as in the fourth exemplary embodiment, the bias potential generating circuit 50 according to the fifth exemplary embodiment allows the switch SW to be turned ON and OFF by a pulse width modulation signal generated based on the falling wave form signal 48 which smoothly and monotonously decreases (substantially in the shape of S) during the shutdown period of the bias potential generating circuit 50. Accordingly, the potential of the reference potential input terminal IN1 of the amplifier OP decreases by degrees from the reference potential VSG, as shown in FIG. 10.

Accordingly, in a case in which the bias potential generating circuit 50 is applied to, for example, an audio amplifier, the bias potential generating circuit 50 according to the fifth exemplary embodiment can effectively prevent pop noise caused by a rapid change of the potential of the reference potential input terminal IN1, not only during the startup period of the bias potential generating circuit 50, but also during the shutdown period.

Further, in the bias potential generating circuit 50 according to the fifth exemplary embodiment, the falling sine wave circuit does not need to be provided, and instead, the inverter circuit 52 may be provided. Accordingly, the bias potential generating circuit 50 according to the fifth exemplary embodiment can be a simple circuit configuration.

Note that, the bias potential generating circuits described in the above-described exemplary embodiments are each suitable for generating a reference potential in, for example, an audio amplifier or the like. However, the device to which the present invention can be applied is not limited thereto. The present invention can be applied to various devices used for generating a reference potential.

Further, in each of the exemplary embodiments, a case where a ΔΣ conversion circuit is used as a circuit for generating a pulse width modulation signal has been described. However, the circuit for generating a pulse width modulation signal is not limited to the ΔΣ conversion circuit, and other PWM signal generating circuits may be used.

What is claimed is:

1. A bias potential generating circuit comprising:
    a clock signal generating section that generates a clock signal having a predetermined frequency;
    a rising wave form signal generating section that generates, synchronous to the clock signal, a rising wave form signal having a wave form of a rising portion of a sine wave;
    a pulse width modulation signal generating section that generates, synchronous to the clock signal, a pulse width modulation signal by pulse width modulating the rising wave form signal;
    a first resistor having a first end connected to a reference potential input terminal of an operational amplifier;
    a second resistor having a first end connected to the first end of the first resistor and to the reference potential input terminal of the operational amplifier, and a second end connected to a ground; and
    a switch, having a first end connected to a power supply and a second end connected to a second end of the first resistor, that turns ON and OFF based on the pulse width modulation signal.

2. The bias potential generating circuit according to claim 1, further comprising:

a noise removal filter provided between the reference potential input terminal of the operational amplifier, and a connecting portion of the first resistor and the second resistor.

3. The bias potential generating circuit according to claim 2,
wherein the clock signal generating section generates a clock signal having a frequency higher than the predetermined frequency, and
wherein the noise removal filter includes a resistor having a resistance value lower than a resistance value that corresponds to the predetermined frequency, and a capacitative element.

4. The bias potential generating circuit according to claim 1, further comprising:
a falling wave form signal generating section that generates a falling wave form signal having a wave form of a falling portion of the sine wave; and
a wave form signal selecting section that selects the rising wave form signal and outputs the rising wave form signal to the pulse width modulation signal generating section during a startup period of the bias potential generating circuit, and that selects the falling wave form signal and outputs the falling wave form signal to the pulse width modulation signal generation section during a shutdown period of the bias potential generating circuit.

5. The bias potential generating circuit according to claim 1, further comprising
an inversion section that generates an inverted pulse width modulation signal by inverting the pulse width modulation signal,
wherein during a startup period of the bias potential generating circuit, the pulse width modulation signal is selected and outputted to the switch, and during a shutdown period of the bias potential generating circuit, the inverted pulse width modulation signal is selected and outputted to the switch.

6. The bias potential generating circuit according to claim 1, wherein the pulse width modulation signal generating section generates the pulse width modulation signal by performing $\Delta\Sigma$ conversion to the rising wave form signal.

* * * * *